US010313869B2

United States Patent
Suh et al.

(10) Patent No.: US 10,313,869 B2
(45) Date of Patent: *Jun. 4, 2019

(54) COMMUNICATION SUPPORTING METHOD AND APPARATUS USING NON-ACCESS STRATUM PROTOCOL IN MOBILE TELECOMMUNICATION SYSTEM

(71) Applicant: Samsung Electronics Co., Ltd., Suwon-si, Gyeonggi-do (KR)

(72) Inventors: Kyung Joo Suh, Seoul (KR); Ho Gun Lim, Yongin-si (KR); Kyung Hun Jung, Suwon-si (KR); Sung Wook Choi, Seoul (KR); Sang Soo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

This patent is subject to a terminal disclaimer.

(21) Appl. No.: 15/440,364

(22) Filed: Feb. 23, 2017

(65) Prior Publication Data

US 2017/0164183 A1    Jun. 8, 2017

Related U.S. Application Data

(63) Continuation of application No. 14/507,012, filed on Oct. 6, 2014, now Pat. No. 9,584,999, which is a (Continued)

(30) Foreign Application Priority Data

Sep. 9, 2010 (KR) ............... 10-2010-0088232

(51) Int. Cl.
*H04W 4/00* (2018.01)
*H04W 8/14* (2009.01)
(Continued)

(52) U.S. Cl.
CPC ............ *H04W 8/14* (2013.01); *H04W 8/26* (2013.01); *H04W 36/14* (2013.01); *H04W 48/16* (2013.01);
(Continued)

(58) Field of Classification Search
CPC ..... H04W 24/00; H04W 36/14; H04W 48/16; H04W 60/00; H04W 74/004;
(Continued)

(56) References Cited

U.S. PATENT DOCUMENTS 8,855,051 B2    10/2014  Suh et al.
9,584,999 B2 *   2/2017  Suh .................... H04W 8/26
(Continued)

FOREIGN PATENT DOCUMENTS

CN    101005692 A    7/2007
CN    101141810 A    3/2008
(Continued)

OTHER PUBLICATIONS

Technical Specification Group Core Network and Terminals; Numbering, addressing and identification (Release 9) 3GPP TS 23.003 V9.3.0; 650 Route des Lucioles—Sophia Antipolis Valbonne—France.
(Continued)

*Primary Examiner* — Minh Trang T Nguyen
(74) *Attorney, Agent, or Firm* — Jefferson IP Law, LLP (57) ABSTRACT

A method and apparatus for supporting Non-Access Stratum (NAS) communication between a User Equipment (UE) and a Mobility Management Entity (MME) efficiently by addressing the signaling problems occurring between the UE and the MME in a situation where it is necessary for a network node to identify the UE and acquire UE information, if there is any, from another network node to which the UE has been attached, are provided. The method for com-
(Continued)

munication between the UE and network based on the NAS protocol messages and operations is implemented with the involvement a UE, an MME, and an old MME or an old Serving General Packet Radio Service (GPRS) Support Node (SGSN) to which the UE has been attached before so as to facilitate discovering a best node using the UE information acquired from the old MME or old SGSN during the communication between the UE and the network, resulting in a reduction of a communication delay between the UE and network and an improvement of communication efficiency.

20 Claims, 8 Drawing Sheets

Related U.S. Application Data continuation of application No. 13/228,713, filed on Sep. 9, 2011, now Pat. No. 8,855,051.

(51) Int. Cl.
*H04W 8/26* (2009.01)
*H04W 48/16* (2009.01)
*H04W 36/14* (2009.01)
*H04W 60/00* (2009.01)
*H04W 24/00* (2009.01)
*H04W 74/00* (2009.01)
*H04W 88/06* (2009.01)
*H04W 92/02* (2009.01)
*H04W 92/06* (2009.01)

(52) U.S. Cl.
CPC ............ *H04W 60/00* (2013.01); *H04W 24/00* (2013.01); *H04W 74/004* (2013.01); *H04W 88/06* (2013.01); *H04W 92/02* (2013.01); *H04W 92/06* (2013.01)

(58) Field of Classification Search
CPC ......... H04W 88/06; H04W 8/14; H04W 8/26; H04W 92/02; H04W 92/06
See application file for complete search history.

(56) References Cited

U.S. PATENT DOCUMENTS

| 2005/0202815 | A1* | 9/2005 | Verma ............... H04L 63/0407 455/433 |
|---|---|---|---|
| 2009/0047951 | A1 | 2/2009 | Yeoum et al. |
| 2009/0073933 | A1 | 3/2009 | Madour et al. |
| 2009/0258631 | A1 | 10/2009 | Forsberg et al. |
| 2010/0105386 | A1 | 4/2010 | Guo |
| 2011/0110350 | A1 | 5/2011 | Lu et al. |
| 2011/0142239 | A1 | 6/2011 | Suh et al. |
| 2011/0170517 | A1 | 7/2011 | Bakker et al. |
| 2011/0171953 | A1 | 7/2011 | Faccin et al. |

FOREIGN PATENT DOCUMENTS

| CN | 101282511 A | 10/2008 |
|---|---|---|
| EP | 2 159 972 A1 | 3/2010 |
| EP | 2 161 963 A1 | 3/2010 |
| JP | 2005-536121 A | 11/2005 |
| JP | 2010-537523 A | 12/2010 |
| KR | 10-2009-0016430 A | 2/2009 |
| KR | 10-2010-0021385 A | 2/2010 |
| KR | 10-2010-0021690 A | 2/2010 |
| WO | 2009-056073 A1 | 5/2009 |
| WO | 2010-004295 A2 | 1/2010 |

OTHER PUBLICATIONS

Technical Specification Group Core Network and Terminals; 3GPP Evolved Packet System (EPS); Evolved General Packet Radio Service (GPRS) Tunnelling Protocol for Control plane (GTPv2-C); Stage 3 (Release 9) The present3GPP TS 29.274 V9.3.0; 650 Route des Lucioles—Sophia Antipolis Valbonne—France.
Ericsson, Discussion on Determination of the old node type [online], 3GPP TSG CT WG4 Meeting #50 C4-102255.
Technical Specification Group Services and System Aspects; General Packet Radio Service (GPRS) enhancements for Evolved Universal Terrestrial Radio Access Network (E-UTRAN) access (Release 10)3GPP TS 23.401 V10.0.0; 650 Route des Lucioles—Sophia Antipolis Valbonne—France.
AT&T, Correction of MME/SGSN Node Type Indication for mapping LAC to GUTI, 3GPP TSG CT4 Meeting #50 C4-102046.
Deutsche Telekom, Clarification of UE behaviour with regards to LAC format [online], 3GPP TSG CT4 Meeting #50 C4-102400.
CATT, "Attach After ISR Function Activation", 3GPP TSG-SA WG2#64, S2-082401, Apr. 11, 2008.
Nokia Siemens Networks, "Clarification of Delete Session Request Information Elements", 3GPP TSG-SA WG2#80, S2-104376, Sep. 3, 2010.
Anite; Correction to MME Group ID to set MSB to 1; 3GPP TSG RAN WG R5 Meeting #46Bis; R5-102140r2; Apr. 13-16, 2010; China.

* cited by examiner

COMMUNICATION SUPPORTING METHOD AND APPARATUS USING NON-ACCESS STRATUM PROTOCOL IN MOBILE TELECOMMUNICATION SYSTEM

CROSS-REFERENCE TO RELATED APPLICATION(S)

This application is a continuation of prior application Ser. No. 14/507,012, filed on Oct. 6, 2014, which will issue as U.S. Pat. No. 9,584,999 on Feb. 28, 2017 and was a continuation of prior application Ser. No. 13/228,713, filed on Sep. 9, 2011, which has issued as U.S. Pat. No. 8,855,051 on Oct. 7, 2014 and claimed the benefit under 35 U.S.C. § 119(a) of a Korean patent application filed on Sep. 9, 2010 in the Korean Intellectual Property Office and assigned Serial number 10-2010-0088232, the entire disclosure of which is hereby incorporated by reference.

BACKGROUND OF THE INVENTION

1. Field of the Invention

The present invention relates to a mobile communication system. More particularly, the present invention relates to a method and apparatus for supporting Non-Access Stratum (NAS) communication between a User Equipment (UE) and a Mobility Management Entity (MME) efficiently by addressing the signaling problems occurring between the UE and MME in a situation where it is necessary for a network node to identify the UE and acquire UE information, if there is any, from another network node to which the UE have been attached after a movement between two different Radio Access Technologies (RATs) such as Evolved Universal Terrestrial Radio Access Network (EUTRAN) and Universal Terrestrial Radio Access Network (UTRAN) or Global System for Mobile Communications (GSM)/Enhanced Data Rates for GSM Evolution (EDGE) Radio Access Network (GERAN).

2. Description of the Related Art

As one of the representative mobile communication standard organizations, the $3^{rd}$ Generation Partnership Project (3GPP) has defined Evolved Packet System (EPS) with the introduction of MME.

The NAS protocols for the 3GPP 3G system have been revised in order to meet the requirements of high-speed data transmission in the next generation mobile communication system. The revision also has included backward compatibility to the 2G and 3G networks of 3GPP. In detail, when attaching to a network or updating a tracking area, the UE identifies the network node which it has accessed before using the node identity information of the UE identifier.

In a carrier network of the related art, however, the network is configured using even the bit information indicating network node identity information, and thus there is no room to distinguish between the legacy network mobility management node and the MME introduced for supporting the EUTRAN, resulting in a node identification failure problem. There is therefore a need of a method for improving communication service quality by minimizing processing delay with the provision of the information for the UE to discover the network node to which the UE has attached before and the acquisition of the UE information based on the provided information in the communication between the UE and the network through modification of the NAS protocol or a certain procedure of the UE or the mobility management node.

SUMMARY OF THE INVENTION

Aspects of the present invention are to address at least the above-mentioned problems and/or disadvantages and to provide at least the advantages described below. Accordingly, an aspect of the present invention is to provide a communication method and system for supporting Non-Access Stratum (NAS) communication between a User Equipment (UE) and a network node efficiently in an evolved mobile communication system including $3^{rd}$ Generation Partnership Project (3GPP) Evolved Packet System (EPS) supporting Access Stratum (AS) and NAS protocols on layer 2, especially when the UE in idle mode moves or connects to a network or updates the tracking area or performs handover between different Radio Access Technologies (RAT) including Evolved Universal Terrestrial Radio Access Network (EUTRAN) and Universal Terrestrial Radio Access Network (UTRAN) or Global System for Mobile Communications (GSM)/Enhanced Data Rates for GSM Evolution (EDGE) Radio Access Network (GERAN) (UTRAN/GERAN).

Another aspect of the present invention is to provide a communication method and system that is capable of supporting NAS authentication and NAS communication between a UE and a network entity such as a Mobility Management Entity (MME) without a processing delay by specifying the operations of the UE, MME, and Serving General Packet Radio Service (GPRS) Support Node (SGSN) in the NAS protocol during the roaming of the UE between different technology-based networks including GERAN, UTRAN, EUTRAN, and other equivalent access networks.

The present invention relates to a method and system for facilitating a UE to discover a best node during or in attempt of communication with a network node using the NAS protocols, and the method for communication between the UE and network based on the NAS protocol messages and operations according to the present invention is implemented with the involvement a UE, an MME, and an old MME or old SGSN to which the UE has previously attached so as to facilitate discovering the best node using the UE information acquired from the old MME or old SGSN during the communication between the UE and the network, resulting in a reduction of communication delay between the UE and network and an improvement of communication efficiency.

As aforementioned, the present invention is capable of maintaining the communication between UE and network during the handover between two different RATs such as EUTRAN and UTRAN/GERAN, resulting in reduction of communication delay.

In accordance with an aspect of the present invention, a communication support method of an MME in a mobile communication system is provided. The method includes receiving a Packet-Temporary Mobile Subscriber Identity (P-TMSI) signature from a UE in an access request, and determining an old network node which the UE has accessed previously by analyzing the P-TMSI.

In accordance with another aspect of the present invention, a communication support apparatus of an MME in a mobile communication system is provided. The apparatus includes a communication unit which receives a P-TMSI signature from a UE in an access request, and a determination unit which determines an old network node which the UE has accessed previously by analyzing the P-TMSI.

In accordance with another aspect of the present invention, a communication support method of a UE in a mobile communication system is provided. The method includes transmitting a P-TMSI signature to an MME in an access request, and receiving an access response from the MME in response to the access request, wherein the MME analyzes the P-TMSI to determine an old network node which the UE has accessed previously.

In accordance with still another aspect of the present invention, a communication support apparatus of a UE in a mobile communication system is provided. The apparatus includes a communication unit which is responsible for communication with an MME, and a control unit which transmits a P-TMSI signature to the MME in an access request and receives an access response from the MME in response to the access request, wherein the MME analyzes the P-TMSI to determine an old network node to which the UE has accessed previously.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The subject matter of the present invention is to provide a method for reducing the delay of Non-Access Stratum (NAS) communication between a User Equipment (UE) and a Mobility Management Entity (MME) by optimizing the operations of the UE, MME, and Serving General Packet Radio Service (GPRS) Support Node (SGSN) in the NAS signaling. Although the description is directed to the $3^{rd}$ Generation Partnership Project (3GPP)-based system including Evolved Packet System (EPS), Universal Terrestrial Radio Access Network (UTRAN), and Global System for Mobile Communications (GSM)/Enhanced Data Rates for GSM Evolution (EDGE) Radio Access Network (GERAN), the present invention can be applied to other types of communication systems using NAS.

Figure 1:
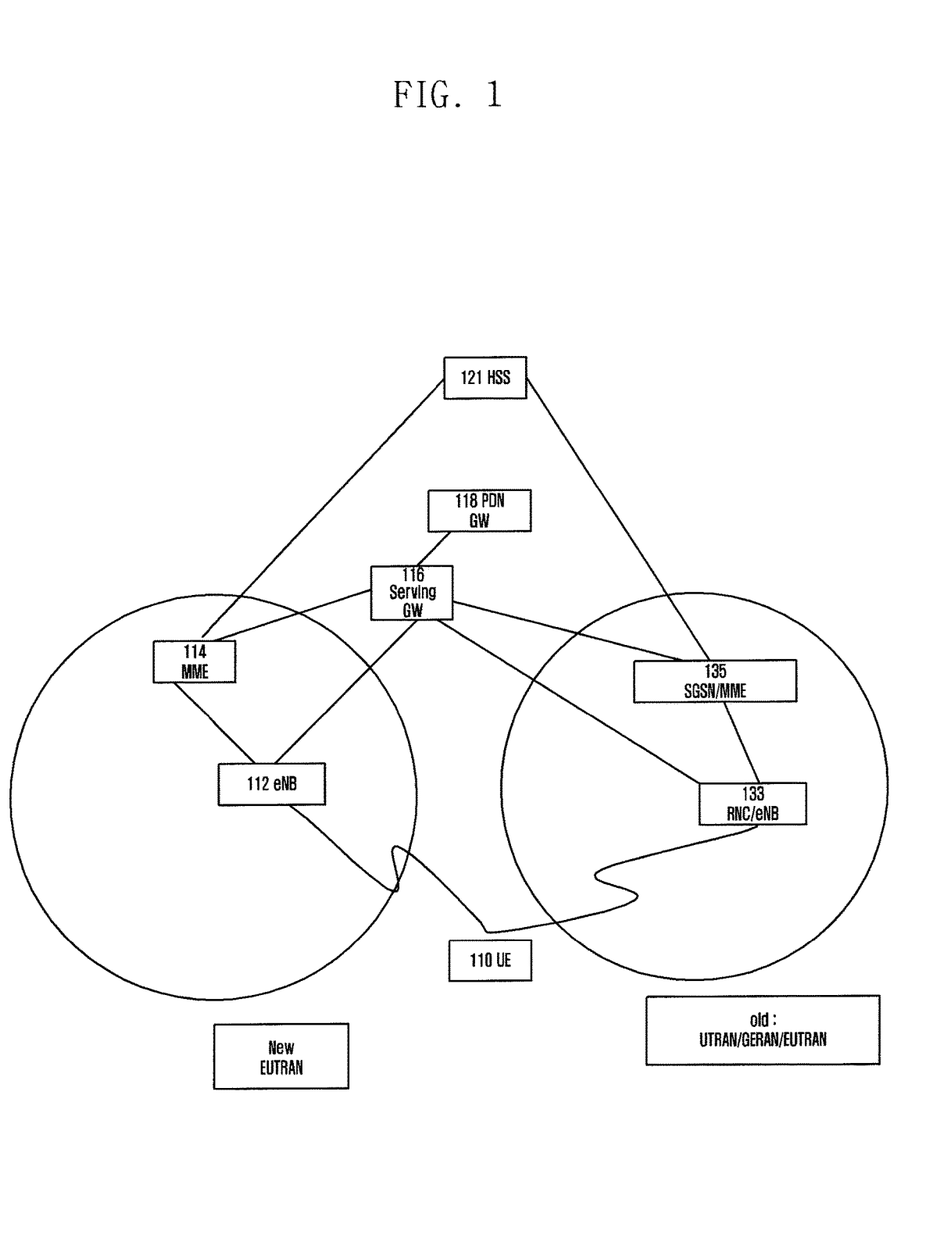
FIG. 1 is a schematic diagram illustrating communication environment of the mobile communication system according to an exemplary embodiment of the present invention.

In the exemplary embodiment of FIG. 1, the present invention proposes a communication method between a UE and an MME and operations thereof based on the NAS protocol during the movement of the UE between different Radio Access Technologies (RAT) including Evolved Universal Terrestrial Radio Access Network (EUTRAN) and Universal Terrestrial Radio Access Network (UTRAN), and it will be obvious to those skilled in the art that the disclosed communication method can be applied to other mobile communication systems implemented based on similar or different protocols but operating similarly in similar technological background and channel format with minor changes and modifications without departing from the scope of the present invention.

FIG. 1 is a schematic diagram illustrating a communication environment of a mobile communication system according to an exemplary embodiment of the present invention. The description is directed to an exemplary 3GPP EPS system. Although the description is directed to the case where the UE connects to a EUTRAN and then moves to another RAT network or connects to an RAT network and then moves to the EUTRAN, the present invention can be applied to other mobile communication systems operating in a similar manner.

Referring to FIG. 1, the base stations (referred to as Evolved Node Base Station, E Node B, and eNB, or Radio Network Controller (RNC)) 112 and 133 are responsible for establishing radio links to communicate with the UE 110 within the cell as the service coverage thereof. The UE 110 is a terminal that connects to a packet data network such as the Internet via a Serving Gateway (hereinafter, referred to as Serving GW or S-GW) 116. In the following description, the Packet Data Network Gateway (hereinafter, referred to as PDN GW) 118 as a significant network entity of the packet data network is responsible for the functions of Home Agent HA. The Mobility Management Entity/Serving GPRS Support Node (MME/SGSN) 135 is responsible for management of mobility, location, and registration of the UE. In order to manage the authentication information of the user or UE, the Home Subscriber Server (HSS) 121 is connected to the MME 114 and MME/SGSN 135 via an interface.

The eNB/RNC 133, SGW 116, and MME/SGSN 135 are connected via data paths with the interface for managing the mobility of UE. The UE 110 and MME/SGSN 135 have an NAS protocol stack to communicate each other for the mobility management and session management. In the described exemplary embodiment, the description is directed to the situation in which the UE 100 connected to an old network (or source network) moves to connect to a new network or updates location. The source network can be one of various RATs including EUTRAN, UTRAN, and GERAN, and it is assumed that the UE moves from the source network to EUTRAN as the new network (or target network). If it moves to the target network, the UE 110 connects to the eNB 112 so as to be served by the eNB 112, MME 114, and HS S 121. The MME 114 of the new network and the MME/SGSN 135 of the old network are connected with each other so as to exchange the information necessary. A description is made of the operations of the UE 110 and MME 114 operating based on the NAS protocol in the above-structured network with reference to FIGS. 2 to 8. In the mobile communication system according to an exemplary embodiment of the present invention, when a request message is received from the UE, the network node analyzes the request message to check the old network node to which the UE has been attached. The new network node requests the old network node for the information related to the UE. When the UE information is received from the old network node, the new network node sends a response message to the UE using the acquired UE information.

In the mobile communication system of the present invention, the UE configures the request message. The UE configures the request message in order for the network node to analyze the request message to check the old network node. The UE sends the request message to the network node. Afterward, the UE receives the response message transmitted by the network node in response to the request node.

Here, the request message includes the connection request message for connection to the network node and the update request message for updating the UE location. The new network node can be an MME, and the old network node can be a SGSN or MME.

Figure 2:
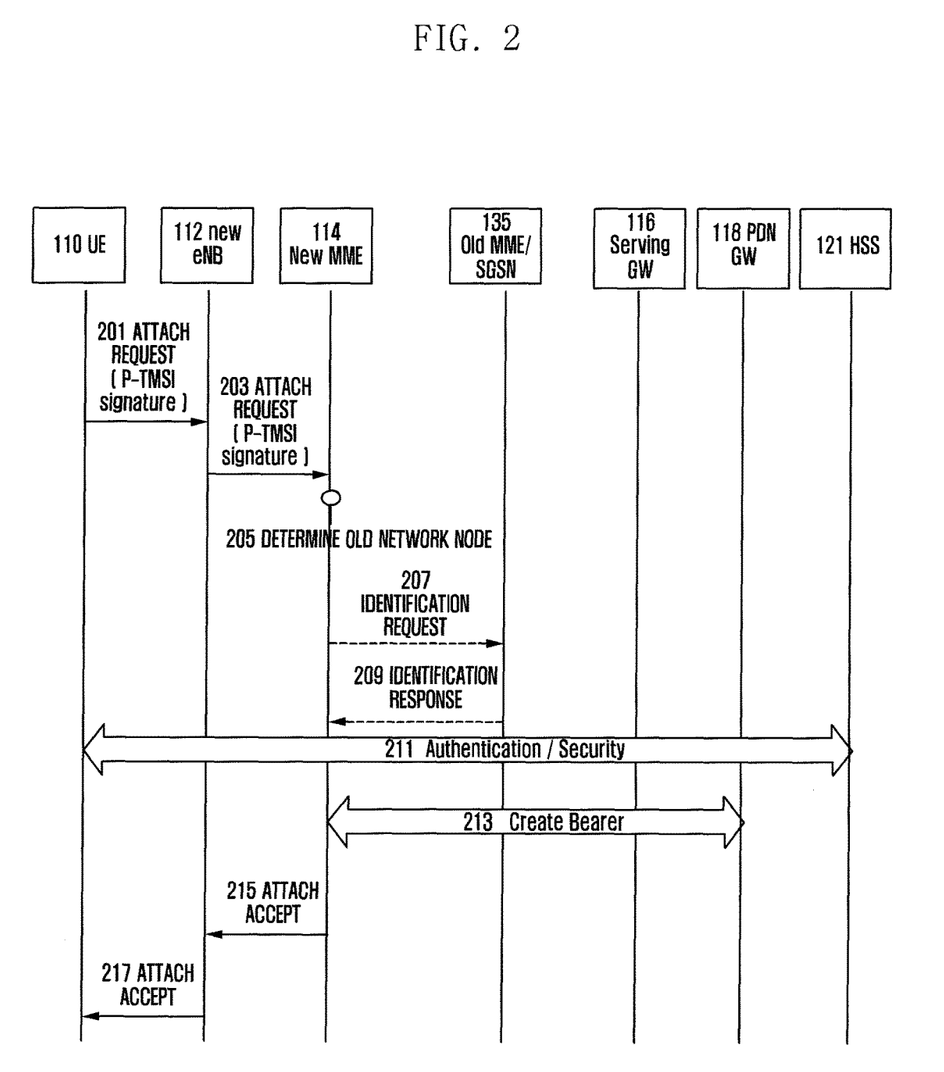
FIG. 2 is a signaling diagram illustrating a network attachment procedure of a User Equipment (UE) according to an exemplary embodiment of the present invention.

FIG. 2 is a signaling diagram illustrating a network attachment procedure of a UE according to an exemplary embodiment of the present invention.

Referring to FIG. 2, the UE 110 requests attachment to the network at step 201. At this time, the UE sends an access request message, i.e., Attach Request message, including UE identity information which is referred to as Packet-Temporary Mobile Subscriber Identity (P-TMSI) signature. The P-TMSI signature is the information to be used in the attempt of attachment to a network since the UE 110 has successfully connected to an SGSN. The Attach Request message is delivered to the MME 114 via the eNB 112 at step 203.

If it is determined that the UE 110 has accessed the old MME/SGSN 135, the new MME 114 determines the type of the old network node at step 205. The old network node type is determined by referencing the Most Significant Bit (MSB) of the Local Area Code (LAC) or MME Group Identity (MMEGI) in the Globally Unique Temporary Identity (GUTI) of the UE 110. Once the old network node type is determined (if the MSB is set to 1, the old network is determined to be EUTRAN, and otherwise the old network is determined to be UTRAN/GERAN), the UE discovers the MME or SGSN in the corresponding network. In the case that the MSB is set to 1 for the UTRAN/GERAN (by some mobile carriers), if the Attach Request message transmitted by the UE 110 includes a valid P-TMSI signature, it can be determined that the UE 110 has accessed the GERAN/UTRAN previously.

Next, the new MME 114 requests the MME/SGSN 135, as the old serving network of the UE 110, for the International Mobile Subscriber Identity (IMSI) and Mobility Management (MM) context at step 207. The new MME 114 receives the UE information from the old MME/SGSN 135 at step 209. Next, the authentication and security process is performed at step 211 and then the bearer creation process is performed at step 213. Next, the new MME 114 sends an Attach Accept message to the new eNB 112 at step 215, and the new eNB 112 forwards the Attach Accept message to the UE 110 at step 217 so as to complete the attachment procedure.

Figure 3:
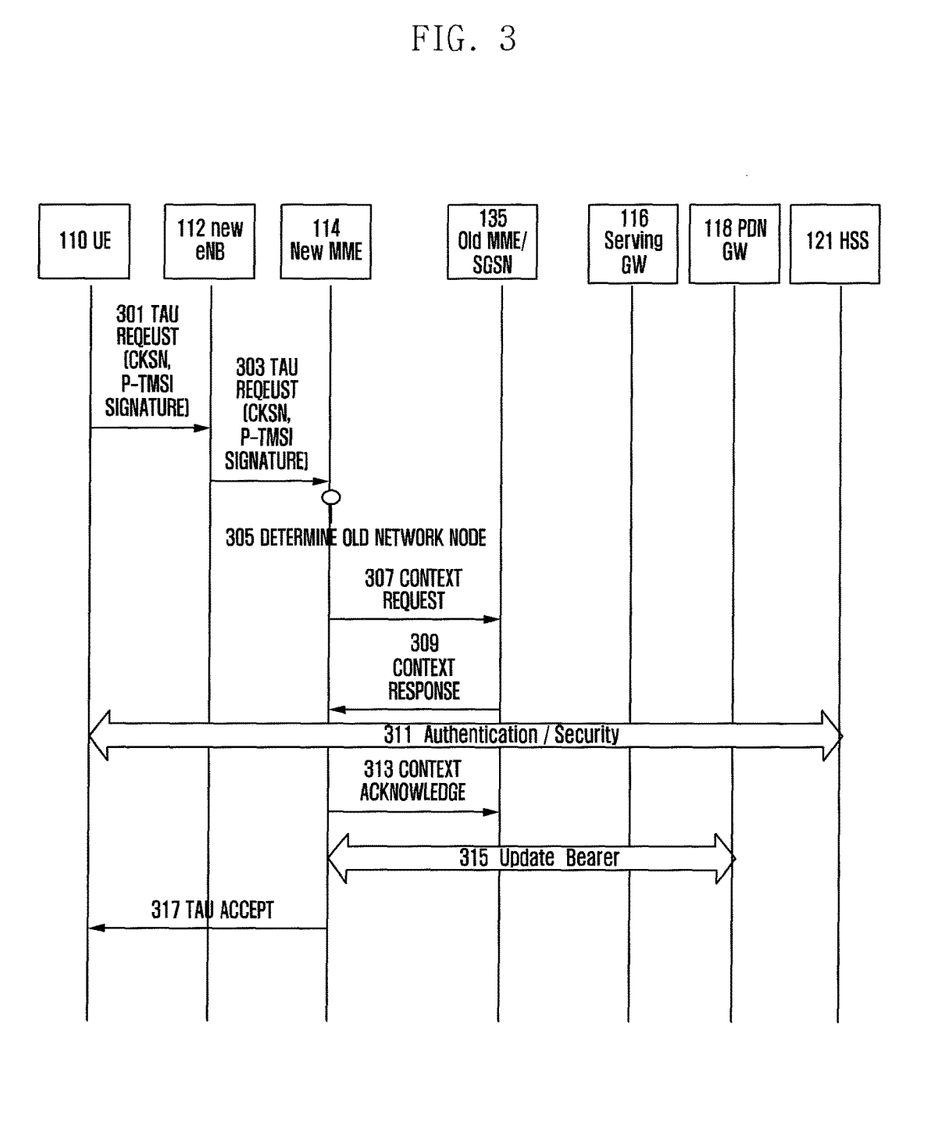
FIG. 3 is a signaling diagram illustrating a tracking area update procedure of a UE according to an exemplary embodiment of the present invention.

FIG. 3 is a signaling diagram illustrating a tracking area update procedure of UE according to an exemplary embodiment of the present invention.

Referring to FIG. 3, the UE 110 sends a Tracking Area Update (TAU) Request message to the network through new eNB 112 at step 301. The TAU Request message includes a P-TMSI signature as UE identity information and a Cipher Key Sequence Number (CKSN) for referencing a cipher key when the UE 110 has accessed a GERAN/UTRAN previously. If there exists a valid CKSN and P-TMSI signature, this means that the UE has successfully connected to an SGSN previously and stored the information for use in the connection or location registration update process afterward. The TAU Request message transmitted by the UE 110 is delivered to the MME 114 via the eNB 112 at step 303.

In case that the UE has accessed the MME/SGSN 135 previously, the MME 114 determines the type of the old network node at step 305. The old network node type is determined by referencing the MSB of the LAC or MMEGI in the GUTI of the UE 110. Once the old network node type is determined (if the MSB is set to 1, the old network is determined to be EUTRAN, and otherwise the old network is determined to be UTRAN/GERAN), the UE discovers the MME or SGSN in the corresponding network. In case that the MSB is set to 1 for the UTRAN/GERAN (by some mobile carriers), if the Attach Request message transmitted by the UE 110 includes a valid P-TMSI signature, it can be determined that the UE 110 has accessed the GERAN/UTRAN previously.

Next, the new MME 114 requests the MME/SGSN 135, as the old serving network of the UE 110, for the IMSI and MM context at step 307. The new MME 114 receives the UE information from the old MME/SGSN 135 at step 309. Next, the authentication and security process is performed at step 311 and then the bearer update process for updating Serving Gateway and UE location information is performed at step 315. The new MME 114 sends a Context Acknowledge message to the old MME/SGSN 135 for acknowledgment of the receipt of the UE information at step 313. After the bearer update at step 315, the new MME 114 sends a TAU Accept message to the UE 110 at step 317 so as to complete the tracking area update procedure.

According to an exemplary embodiment of the present invention, if an Attach Request or a tracking area update request message is received from the UE, the network node checks the MSB of the MMEGI or the LAC of the GUTI of the UE in the request message. If the MSB is set to 0, this means that the old network node is SGSN. Otherwise if the MSB is set to 1, the new network node determines whether the request message includes at least one of a P-TMSI signature and a CKSN. If the request message includes at least one of the P-TMSI signature and the CKSN, this means that the old network node is SGSN. Otherwise if the request message includes neither the P-TMSI signature nor the CKSN, this means that the old network node is MME. Afterward, the new network node requests the old network node for the UE information and sends a response message to the UE using the UE information received from the old network node.

Figure 4:
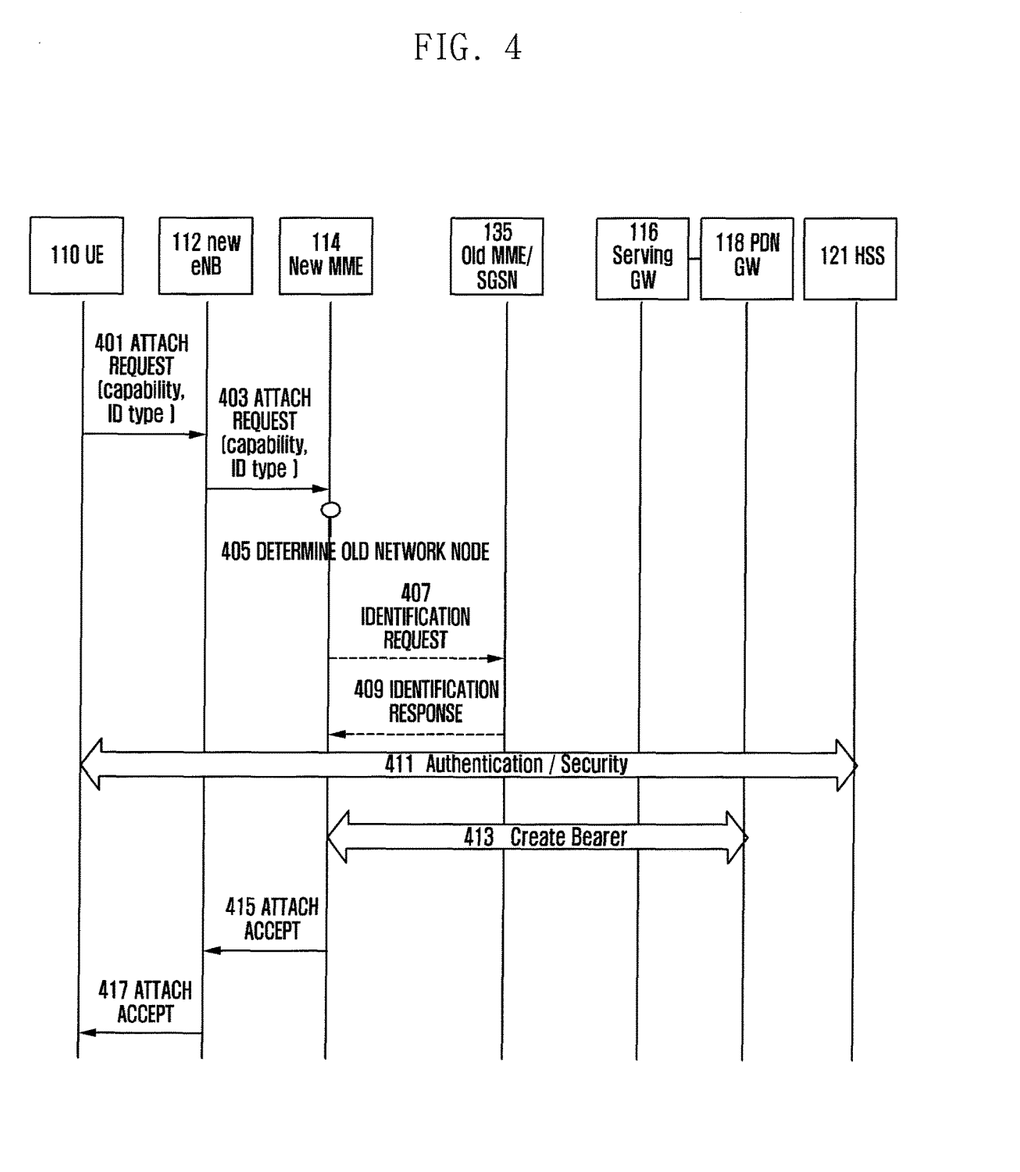
FIG. 4 is a signaling diagram illustrating a network attachment procedure of a UE according to another exemplary embodiment of the present invention.

FIG. 4 is a signaling diagram illustrating a network attachment procedure of UE according to another exemplary embodiment of the present invention.

Referring to FIG. 4, the UE 110 requests attachment to the network at step 401. The Attach Request message transmitted by the UE includes the capability information on whether the UE 110 is capable of discriminating between the identifier assigned as the result of the connection to an MME and the identifier created based on the P-TMSI or Routing Area Identity (RAI). The capability information can be transmitted in a parameter, i.e., a UE network capability Information Element (IE), or in other ways. The UE 110 can transmit the Attach Request message including the information indicating whether the identifier is assigned as the result of attachment to MME or created from the P-TMSI and/or RAI. The identifier creation information can be transmitted by means of a type of identity (identification type or ID type) or other IE or discriminate between LAC and MMEGI. The Attach Request message transmitted by the UE 110 is delivered to the MME 114 via the eNB 112 at step 403.

If it is determined that the UE 110 has accessed the old MME/SGSN 135, the new MME 114 determines the type of the old network node at step 405. The old network node type is determined by referencing the MSB of the LAC or MMEGI in the GUTI of the UE 110. Once the old network node type is determined (if the MSB is set to 1, the old network is determined to be EUTRAN, and otherwise the old network is determined to be UTRAN/GERAN), the UE discovers the MME or SGSN in the corresponding network. In case that the MSB is set to 1 for the UTRAN/GERAN (by some mobile carriers), if the Attach Request message transmitted by the UE 110 includes capability information, this means that the UE 110 has the capability of transmitting identification type along with the GUTI. Accordingly, the MME 114 references an identification type field or the IE related to identification type to determine whether the old network node to which the UE has attached is GERAN/UTRAN or EUTRAN.

Next, the new MME 114 requests the MME/SGSN 135, as the old serving network of the UE 110, for the IMSI and MM context as the UE information at step 407. The new MME 114 receives the UE information from the old MME/SGSN 135 at step 409. Next, the authentication and security process is performed at step 411 and the bearer creation process is performed at step 413. Next, the new MME 114 sends an Attach Accept message to the new eNB 112 at step 415, and the new eNB 112 forwards the Attach Accept message to the UE 110 at step 417 so as to complete the attachment procedure.

Figure 5:
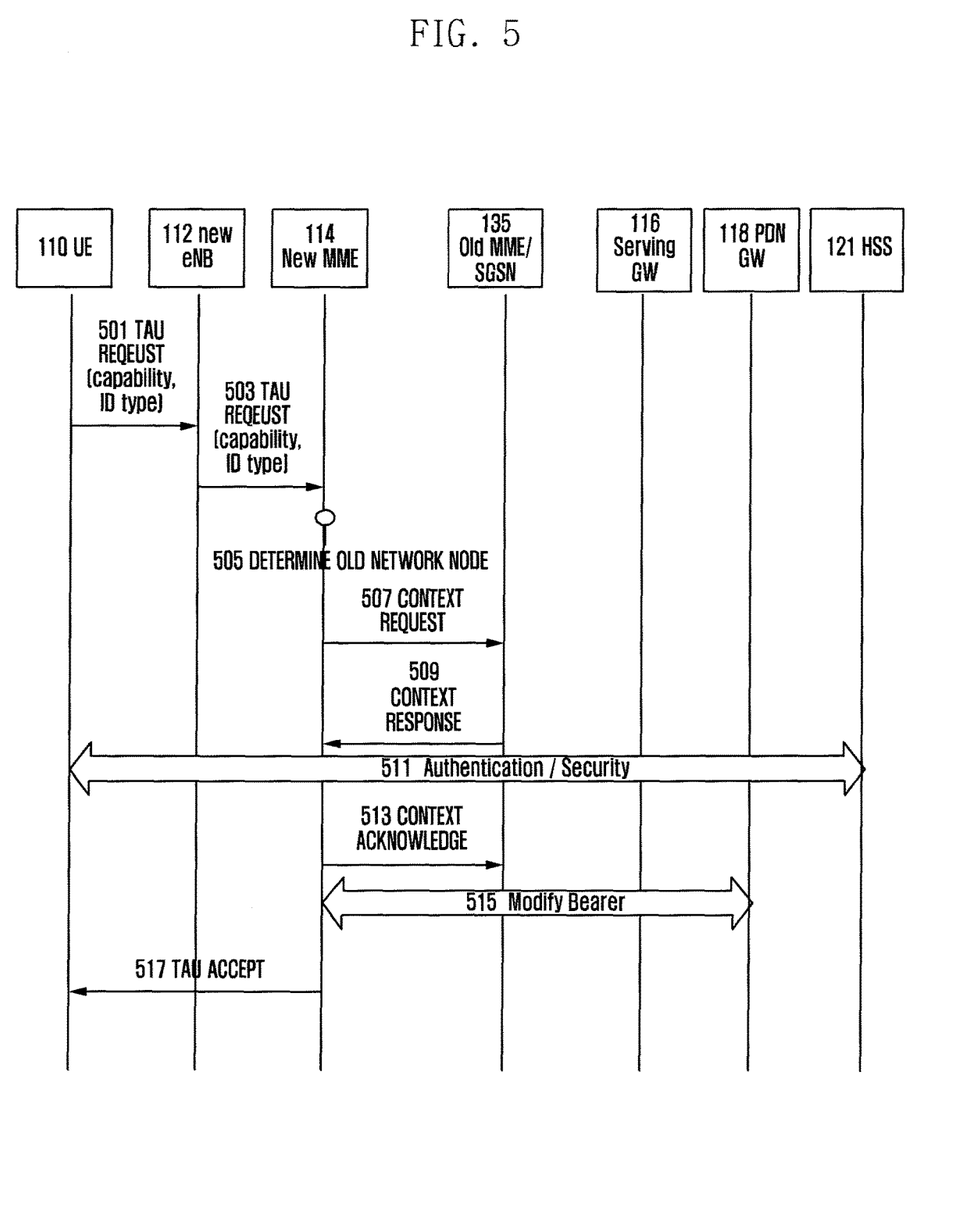
FIG. 5 is a signaling diagram illustrating a tracking area update procedure of a UE according to another exemplary embodiment of the present invention.

FIG. 5 is a signaling diagram illustrating a tracking area update procedure of a UE according to another exemplary embodiment of the present invention.

Referring to FIG. 5, the UE 110 sends a TAU Request message to the network through new eNB 112 at step 501. The Attach Request message transmitted by the UE includes the capability information on whether the UE 110 is capable of discriminating between the identifier assigned as the result of the connection to an MME and the identifier created based on the P-TMSI or RAI. The capability information can be transmitted in a parameter, i.e., a UE network capability IE, or in other ways. The UE 110 can transmit the Attach Request message including the information indicating whether the identifier is assigned as the result of attachment to MME or created from the P-TMSI and/or RAI. The identifier creation information can be transmitted by means of a type of identity (identification type or ID type) or other IE or discriminate between LAC and MMEGI. The Attach Request message transmitted by the UE 110 is delivered to the MME 114 via the eNB 112 at step 503. If it is determined that the UE 110 has accessed the old MME/SGSN 135, the new MME 114 determines the type of the old network node at step 505. The old network node type is determined by referencing the MSB of the LAC or MMEGI in the GUTI of the UE 110. Once the old network node type is determined (if the MSB is set to 1, the old network is determined to be EUTRAN, and otherwise the old network is determined to be UTRAN/GERAN), the UE discovers the MME or SGSN in the corresponding network. In case that the MSB is set to 1 for the UTRAN/GERAN (by some mobile carriers), if the Attach Request message transmitted by the UE 110 includes capability information, this means that the UE 110 has the capability of transmitting identification type along with the GUTI. Accordingly, the MME 114 references an identification type field or the IE related to identification type to determine whether the old network node to which the UE has attached is GERAN/UTRAN or EUTRAN.

Next, the new MME 114 requests the MME/SGSN 135, as the old serving network of the UE 110, for the IMSI and MM context as the UE information at step 507. The new MME 114 receives the UE information from the old MME/SGSN 135 at step 509. Next, the authentication and security process is performed at step 511 and the bearer modification process for updating the serving gateway and UE location information is performed at step 515. The new MME sends a Context Acknowledge message to the old MME/SGSN 135 for acknowledgment of the receipt of the UE information at step 513. After the bearer modification at step 515, the new MME 114 sends a TAU Accept message to the UE 110 at step 517 so as to complete the tracking area update procedure.

According to this exemplary embodiment of the present invention, the UE configures an identification type indicator for discriminating the types of the temporary identifier of the network node which is transmitted in the request message such as the Attach Request and Tracking Area Update Request message. The UE transmits the request message to the network node. Afterward, the UE receives a response message from the network node in response to the request message.

According to another exemplary embodiment of the present invention, if the request message such as Attach Request or Tracking Area Update Request is received from the UE, the network node determines whether the request message includes the identification type indicator for indicating the type of the old network node based on the temporary identifier. If the request message includes the identification type indicator, the network node identifies the old network node as one of SGSN and MME. At this time, the network node analyzes the identification type indicator related to the temporary identifier corresponding to the old network node to determine the old network node as one of SGSN and MME. Afterward, the network nod receives the UE information from the old network node and sends the response message to the UE using the UE information.

Figure 6:
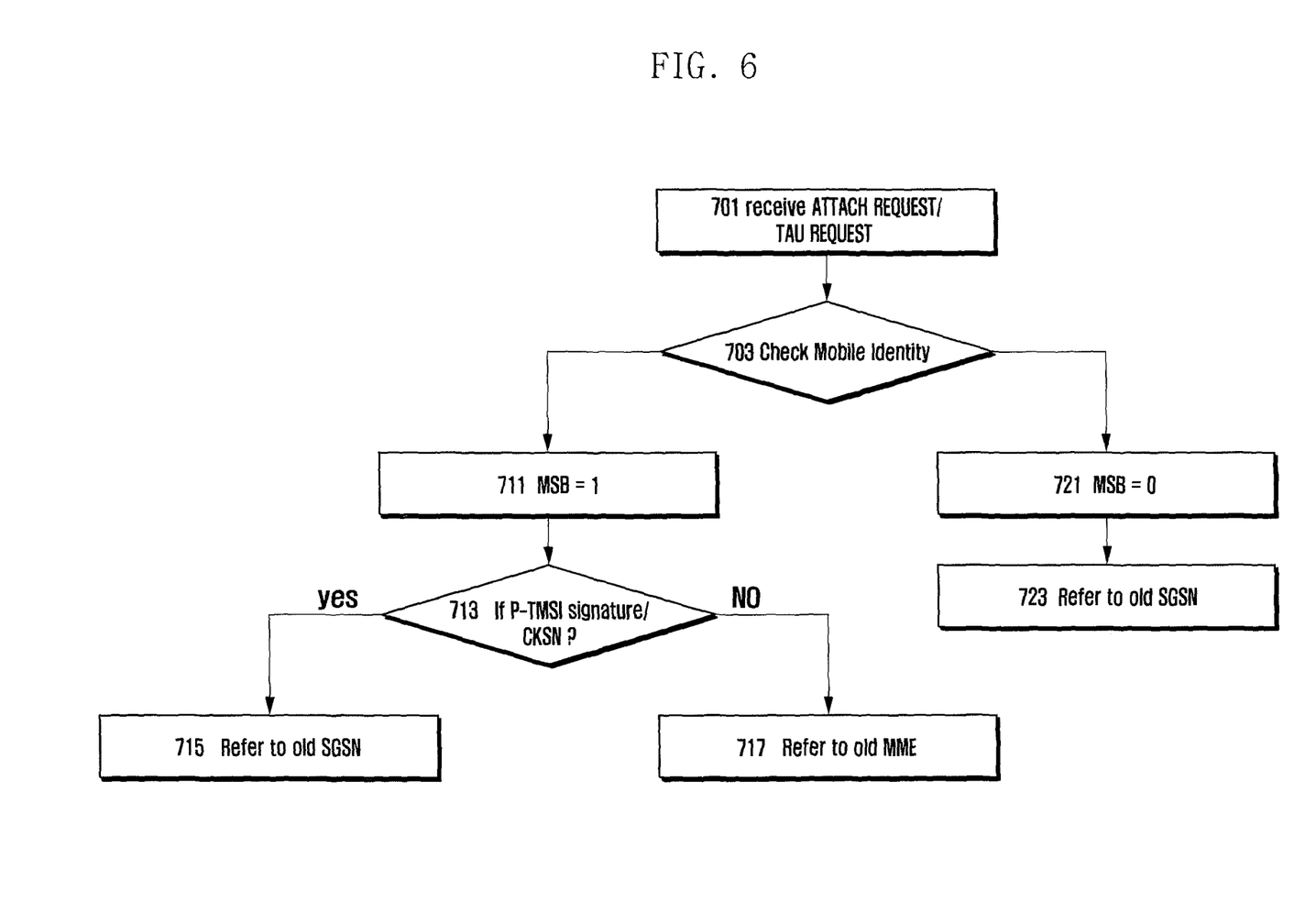
FIG. 6 is a flowchart illustrating operations of a Mobility Management Entity (MME) for supporting communication between a UE and a network node according to an exemplary embodiment of the present invention.

FIG. 6 is a flowchart illustrating operations of an MME for supporting communication between a UE and a network node according to an exemplary embodiment of the present invention.

Referring to FIG. 6, the MME 114 receives the Attach Request/TAU Request message transmitted by the UE 110 at step 701. Upon receipt of the request message, the MME 114 checks the EPS mobile identity IE in the request message at step 703. If the MSB of LAC/MMEGI is determined to be set to 0 at step 721, this means that the old network node to which the UE 110 has been attached is SGSN, and thus the MME 114 discovers the corresponding one among a plurality of SGSNs to request for UE information at step 723.

If the MSB of LAC/MEGI is determined to be set to 1 at step 711, this means that the old network node to which the UE 110 has been attached is MME or SGSN, and thus the MME 114 determines whether the Attach Request message transmitted by the UE 110 includes a valid P-TMSI signature or the TAU Request message transmitted by the UE 110 includes at least one of a CKSN or a P-TMSI signature at step 713. If it is determined that the request message includes a valid CKSN or a P-TMSI signature, this means that the old network node to which the UE has been attached previously is SGSN, and thus the MME 114 discovers the targeted one of SGSNs to request for the UE information at step 715. Otherwise, if it is determined that the request message includes neither a valid P-TMSI signature nor a CKSN, this means that the old network node to which the UE has been attached previously is MME, and thus the MME 114 discovers the targeted one among MMEs to request for the UE information at step 717.

According to an exemplary embodiment of the present invention, the MME includes a communication unit, a determination unit, and a control unit.

The communication unit is responsible for communication with the UE. The communication unit can receive the access request message from the UE. Here, the access request message can be one of an Attach Request or a Tracking Area Update Request.

The determination unit analyzes the access request message transmitted by the UE to determine the type of the old network node. Here, the determination unit analyzes the P-TMSI signature to determine the type of the old network node. The determination unit can include a judging module and an identification module. The determination unit analyzes the P-TMSI signature of the access request message. The identification module judges the old network node as one of MME and SGSN according to the analysis result of P-TMSI signature.

The control unit requests the old network node for the UE information. Upon receipt of the UE information, the control unit controls such that the network node sends the response message to the UE using the acquired UE information.

According to an exemplary embodiment of the present invention, the UE includes a communication unit and a control unit. The control unit controls to transmit an access request message to the MME. Here, the control unit controls such that the P-TMSI signature is transmitted in the access request message. The access request message can be one of an Attach Request and a Tracking Area Update Request of the UE. The communication unit is responsible for communication with the MME. At this time, the communication unit receives an Access Response message from the MME in response to the Access Request message.

Figure 7:
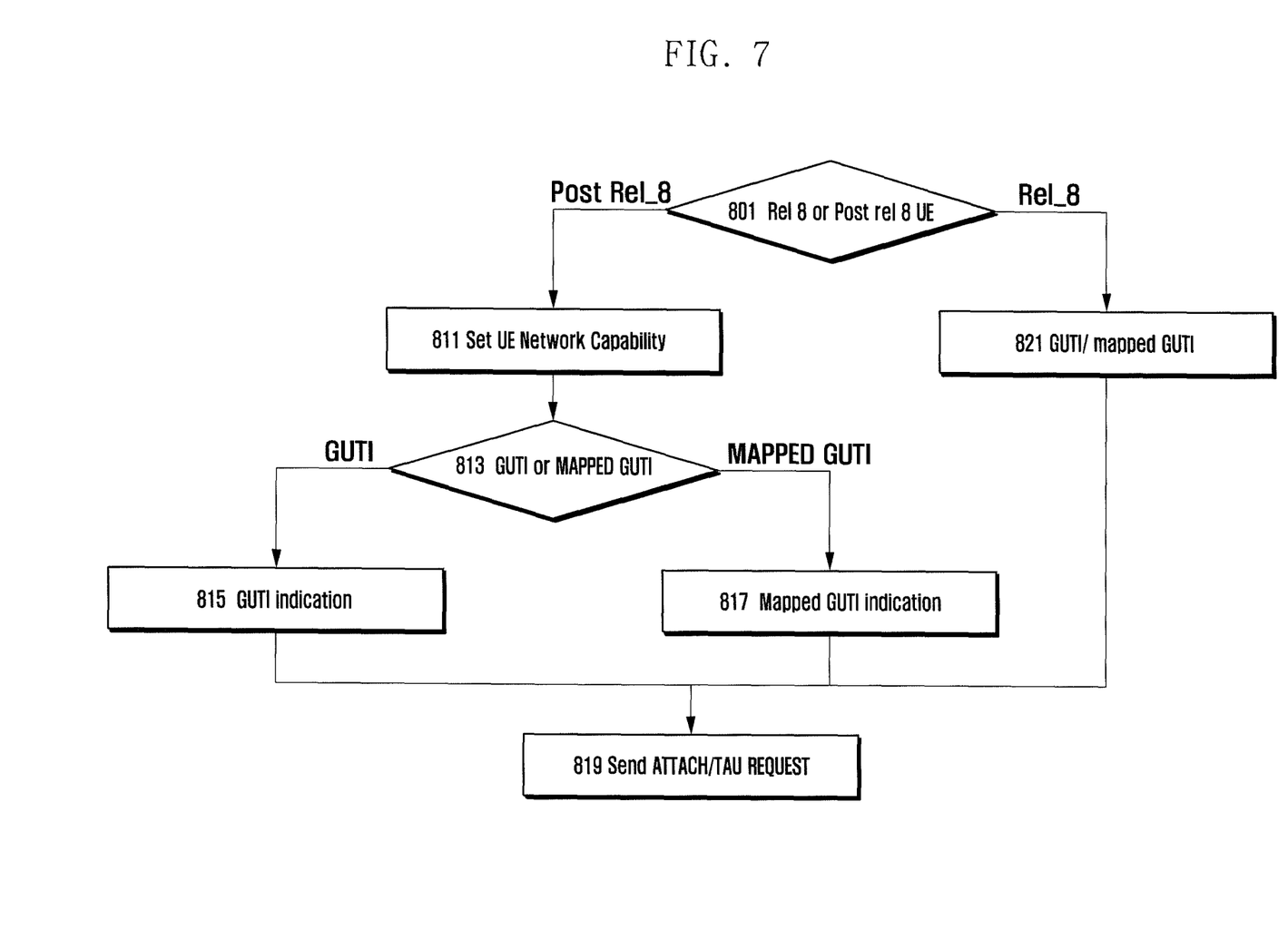
FIG. 7 is a flowchart illustrating operations of a UE for supporting communication between the UE and a network node according to an exemplary embodiment of the present invention.

FIG. 7 is a flowchart illustrating operations of a UE for supporting communication between the UE and a network node according to an exemplary embodiment of the present invention.

Referring to FIG. 7, the UE 110 determines whether the technology release version (hereinafter, referred to as rel) is rel_8 or post rel_8, i.e., rel_9 or rel_10, at step 801. The operations can be defined differently according to the technology release version. In case of rel_8, the UE 110 configures the Attach/TAU Request message with UE network capability or other indication information element indicating GUTI/mapped GUTI or without identifier at step 821 and transmits the Attach/TAU Request message to the network node at step 819.

In case of post rel_8 (i.e., rel_9 or rel_10), the UE 110 sets a valid UE network capability at step 811 and determines whether to use the GUTI or mapped GUTI as the identification type information, based on the identification type indication capability of the UE, at step 813. If it is determined to use GUTI, the UE 110 configures the Attach/TAU Request message with the identification type field or identification type-related IE set to indicate GUTI at step 815, and otherwise to use mapped GUTI, configures the Attach/TAU Request message with the identification type field or identity-related IE set to indicate mapped GUTI at step 817. Next, the UE 110 sends the Attach/TAU Request message to the network at step 819.

According to an exemplary embodiment of the present invention the UE includes a control unit and a communication unit. The control unit configures the request message with the identification type indicator for notifying the network node of the type of the old network node corresponding to the temporary identifier. The control unit configures the request message with the identification type information of the temporary identifier corresponding to the old network node. The communication unit transmits the request message to the network node under the control of the control unit. The communication unit also receives a response message from the network node in response to the request message.

Figure 8:
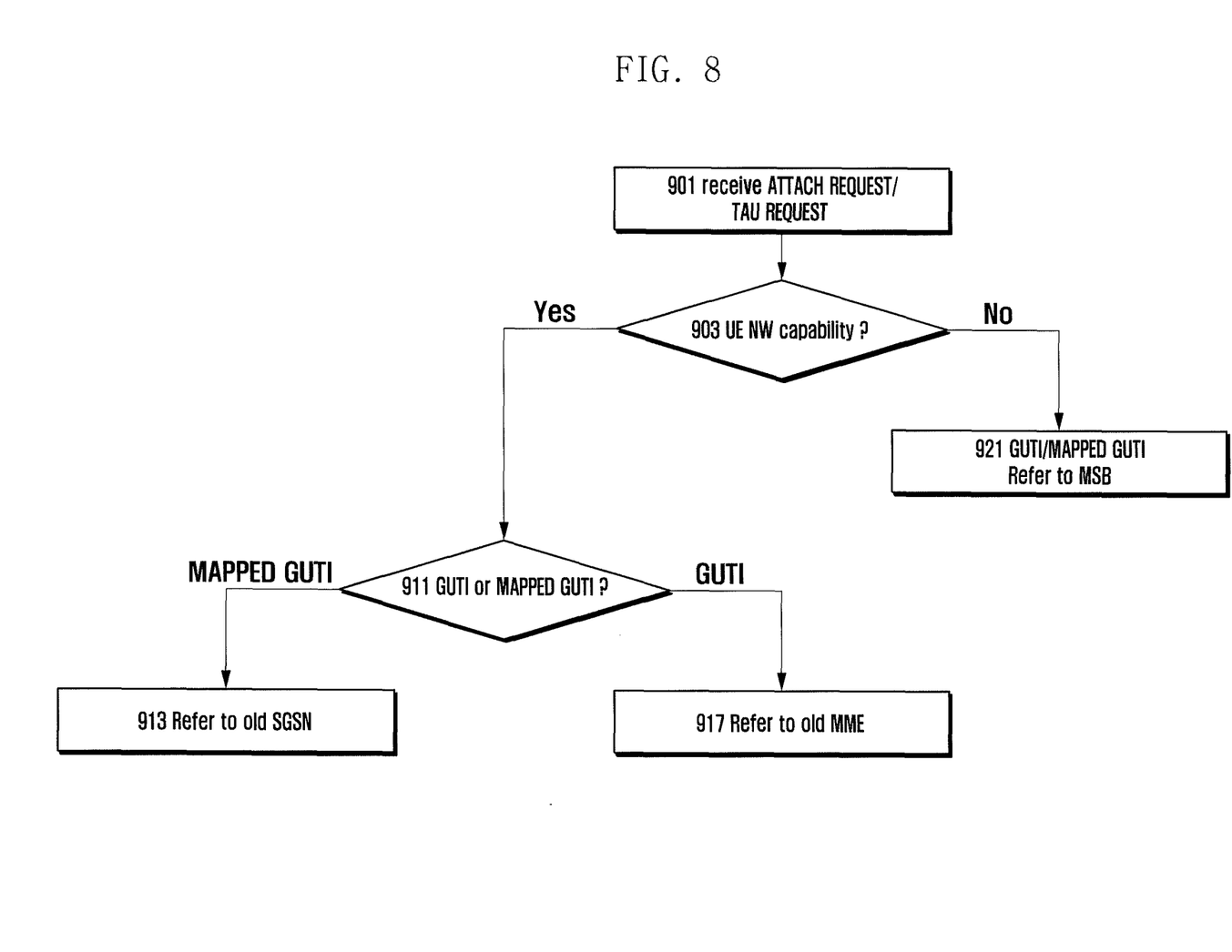
FIG. 8 is a flowchart illustrating operations of an MME for supporting communication between a UE and a network node according to another exemplary embodiment of the present invention.

FIG. 8 is a flowchart illustrating operations of an MME for supporting communication between a UE and a network node according to another exemplary embodiment of the present invention.

Referring to FIG. 8, the MME 114 receives the Attach/TAU Request message transmitted by the UE 110 at step 901. Upon receipt of the Attach/TAU Request message, the MME 114 analyzes the Attach/TAU Request message to check the UE network capability at step 903. If the Attach Request message or the TAU Request message includes the identification type indication capability-related information configured, this means that the UE 110 has the identification type indication capability in transmitting GUTI-related information. In this case, the MME 114 checks the identification type field or identification type-related IE of the request message to determine whether the old network node to which the UE has been attached previously is GERAN/UTRAN or EUTRAN at step 911. If the identification type-related information is determined to be GUTI, this means that the old network node is MME, and thus the MME 114 discovers the targeted one among the MMEs to request for the UE information at step 917. Otherwise if the identification type-related information is the mapped GUTI, this means that the old network node is SGSN, and thus the MME 114 discovers the targeted one among the SGSNs to request for the UE information at step 913.

the capability of informing the network node of the identification type in the message. According to an exemplary embodiment of the present invention, the identification type indication capability is configured in octet 7.

TABLE 1

| 8 | 7 | 6 | 5 | 4 | 3 | 2 | 1 | |
|---|---|---|---|---|---|---|---|---|
| | | UE network capability IEI | | | | | | octet 1 |
| | | Length of UE network capability contents | | | | | | octet 2 |
| EEA0 | 128-EEA1 | 128-EEA2 | EEA3 | EEA4 | EEA5 | EEA6 | EEA7 | octet 3 |
| EIA0 | 128-EIA1 | 128-EIA2 | EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5* |
| UCS2 | UIA1 | UIA2 | UIA3 | UIA4 | UIA5 | UIA6 | UIA7 | octet 6* |
| 0 spare | 0 spare | 0 spare | ID TYPE indication | LPP | LCS | 1xSR VCC | NF | octet 7* |
| 0 | 0 | 0 | 0 | 0 | 0 | 0 | 0 | octet 8*-15* |
| | | | Spare | | | | | |

Identification type indication capability (octet 7, bit 5)
0 Identification type indication mechanisms not supported
1 Identification type indication mechanisms supported Returning to step 903, if the Attach Request message or the TAU Request message does not include identification type discrimination-capability-related information, this means that the UE has no identity indication capability, and thus the MME 114 refers at step 921 to the MSB of the MMEGI or LAC in the GUTI or mapped GUTI so as to select one of the SGSNs as the old network node if the MSB is determined to be set to 0 and one of the MMEs (or one of SGSNs according to the network configuration of the carrier) as the old network node if the MSB is determined to be set to 1. In this case, the MME 114 can determine the SGSN to which the UE 110 has attached previously among a plurality of SGSNs based on the additional information such as a CKSN or a P-TMSI signature.

According to an exemplary embodiment of the present invention, the MME includes a communication unit, a determination unit, and a control unit.

The communication unit is responsible for communication with the UE. The communication unit can receive the Access Request message transmitted by the UE. Here, the Access Request message can be one of Attach Request and Tracking Area Update Request of the UE.

The determination unit analyzes the access request message transmitted by the UE to determine the type of the old network node. The determination unit includes a judging module and an identification module. The judging unit judges whether the identification type indicator for discriminating the type of the old network is configured by the UE in association with the temporary identifier of the UE. If no identification type indicator is configured, the identification module determines the old network node to be one of the SGSNs and MMEs. At this time, the identification module analyzes the information related to the identification type of the temporary identifier corresponding to the old network node in the request message to identify whether the old network node is an SGSN or an MME.

The control unit requests the old network node for the UE information. If the UE information is received from the old network node, the control unit sends the response message to the UE using the acquired UE information.

In order to support communication between the UE and the MME as described above with reference to FIGS. 2 to 8, it is necessary to support the IE in the messages as shown in Table 1. Table 1 shows the IE indicating whether the UE has Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The present invention achieves the following effects from the above described representative exemplary embodiments.

The present invention provides a method and system for addressing the problem of delay in NAS protocol-based communication due to a failure of acquiring UE information from a valid network node, especially in a situation where the UE attempts network attachment or Tracking Area Update during the movement between different RATs including EUTRAN and GERAN/UTRAN. The method and system using the NAS protocol message and operations of the UE and MME that are defined according to the present invention are advantageous to facilitate communication between the UE and network node.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a mobility management entity (MME) in a communication system, the method comprising:
   receiving, from a terminal, an attach request message including information on a temporary identity (ID) related to an old network node;
   identifying whether the temporary ID is mapped from another ID or the temporary ID is a native temporary ID based on the information on the temporary ID;
   identifying a type of the old network node based on a result of the identification;
   transmitting, to the old network node, an identification request message to request an international mobile subscriber identity (IMSI) of the terminal; and
   receiving, from the old network node, an identification response message including the IMSI of the terminal in response to the identification request message.

2. The method of claim 1,
wherein the identification response message includes mobility management context.

3. The method of claim 1,
wherein the information on the temporary ID is an indication using at least one of a most significant bit in a location area code (LAC) or an MME group ID, or
wherein the information on the temporary ID is an explicit indication.

4. The method of claim 1,
wherein the temporary ID is mapped from the other ID, if a most significant bit in the information on the temporary ID is 0, and
wherein the temporary ID is the native temporary ID, if the most significant bit in the information on the temporary ID is 1.

5. The method of claim 1, wherein the other ID is at least one of a packet-temporary mobile subscriber ID or a routing area ID.

6. A method by a terminal in a communication system, the method comprising:
generating an attach request message including information on a temporary identity (ID) related to an old network node; and
transmitting, to a mobility management entity (MME), the attach request message,
wherein whether the temporary ID is mapped from another ID or the temporary ID is a native temporary ID is identified based on the information on the temporary ID,
wherein a type of the old network node is identified based on whether the temporary ID is mapped from the other ID or the temporary ID is the native temporary ID, and
wherein an identification request message is transmitted from the MME to the old network node for requesting an international mobile subscriber identity (IMSI) of the terminal, and an identification response message including the IMSI of the terminal is transmitted from the old network node to the MME in response to the identification request message.

7. The method of claim 6, wherein the identification response message includes mobility management context.

8. The method of claim 6,
wherein the information on the temporary ID is an indication using at least one of a most significant bit in a location area code (LAC) and an MME group ID, or
wherein the information on the temporary ID is an explicit indication.

9. The method of claim 6,
wherein the temporary ID is mapped from the other ID, if a most significant bit in the information on the temporary ID is 0, and
wherein the temporary ID is the native temporary ID, if the most significant bit in the information on the temporary ID is 1.

10. The method of claim 6, wherein the other ID is at least one of a packet-temporary mobile subscriber ID and a routing area ID.

11. A mobility management entity (MME) in a communication system, the MME comprising:
a transceiver configured to transmit and receive a signal; and
at least one processor configured to:
receive, from a terminal, an attach request message including information on a temporary identity (ID) related to an old network node,
identify whether the temporary ID is mapped from another ID or the temporary ID is a native temporary ID based on the information on the temporary ID,
identify a type of the old network node based on a result of the identification,
transmit, to the old network node, an identification request message to request an international mobile subscriber identity (IMSI) of the terminal, and
receive, from the old network node, an identification response message including the IMSI of the terminal in response to the identification request message.

12. The MME of claim 11, wherein the identification response message includes mobility management context.

13. The MME of claim 11,
wherein the information on the temporary ID is an indication using at least one of a most significant bit in a location area code (LAC) and an MME group ID, or
wherein the information on the temporary ID is an explicit indication.

14. The MME of claim 11,
wherein the temporary ID is mapped from the other ID, if a most significant bit in the information on the temporary ID is 0, and
wherein the temporary ID is the native temporary ID, if the most significant bit in the information on the temporary ID is 1.

15. The MME of claim 11, wherein the other ID is at least one of a packet-temporary mobile subscriber ID or a routing area ID.

16. A terminal in a communication system, the terminal comprising:
a transceiver configured to transmit and receive a signal; and
at least one processor configured to:
generate an attach request message including information on a temporary identity (ID) related to an old network node, and
transmit, to a mobility management entity (MME), the attach request message,
wherein whether the temporary ID is mapped from another ID or the temporary ID is a native temporary ID is identified based on the information on the temporary ID,
wherein a type of the old network node is identified based on whether the temporary ID is mapped from the other ID or the temporary ID is the native temporary ID, and
wherein an identification request message is transmitted from MME to the old network node for requesting an international mobile subscriber identity (IMSI) of the terminal, and an identification response message including the IMSI of the terminal is transmitted from the old network node to the MME in response to the identification request message.

17. The terminal of claim 16, wherein the identification response message includes mobility management context.

18. The terminal of claim 16,
wherein the information on the temporary ID is an indication using at least one of a most significant bit in a location area code (LAC) or an MME group ID, or
wherein the information on the temporary ID is an explicit indication.

19. The terminal of claim 16,
wherein the temporary ID is mapped from the other ID, if a most significant bit in the information on the temporary ID is 0, and wherein the temporary ID is the native temporary ID, if the most significant bit in the information on the temporary ID is 1.

20. The terminal of claim 16, wherein the other ID is at least one of a packet-temporary mobile subscriber ID and a routing area ID.

* * * * *